United States Patent [19]
Brockhouse

[11] 3,747,563
[45] July 24, 1973

[54] ANIMAL OPERATED TOILET

[76] Inventor: Aubrey Devere Brockhouse, 515 Courtland Ave., Park Ridge, Ill. 60068

[22] Filed: Nov. 17, 1971

[21] Appl. No.: 199,571

[52] U.S. Cl. ................................................ 119/1
[51] Int. Cl. ............................................ A01k 29/00
[58] Field of Search ......................................... 119/1

[56] References Cited
UNITED STATES PATENTS
3,227,138   1/1966   Campbell ............................. 119/1
2,204,416   6/1940   Kramer ................................ 119/1

*Primary Examiner*—Hugh R. Chamblee
*Attorney*—Robert C. Brown, Jr. et al.

[57] ABSTRACT

An animal operated toilet comprising a frame structure defining a drain floor formed with a drain opening and shaped to direct flushing water to said drain opening, and an entrance to the frame structure, a floating treadle applied over the drain floor and hinged at one end thereof adjacent to but spaced inwardly of the entrance to swing between a level or horizontal position under the dog's weight and an upwardly inclined flush down position in which the other end of the treadle projects upwardly and inwardly of the entrance, a flush tank mounted over the inner end of the treadle including a ball type control valve adapted to release a large quantity of flush down liquid for thorough treadle flush down purposes, and a flush valve actuation arrangement in which the treadle is biased to its upwardly inclined position, and on entry of the dog into the frame structure to defecate, the animal enters on the treadle pressing it to its level position, which conditions the valve actuation arrangement for opening the control valve when the animal leaves the treadle and under the bias that acts on the treadle which returns it to its upwardly inclined position, whereby a large volume water flow is applied to and flushes down the treadle in its inclined position to wash urine and any feces thereon through the drain opening.

8 Claims, 9 Drawing Figures

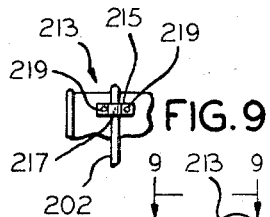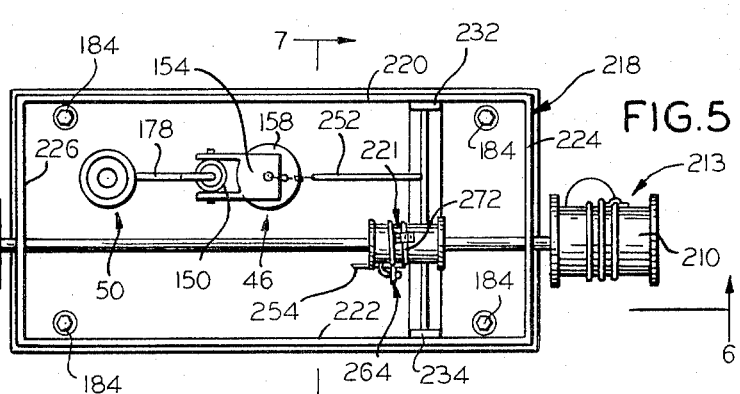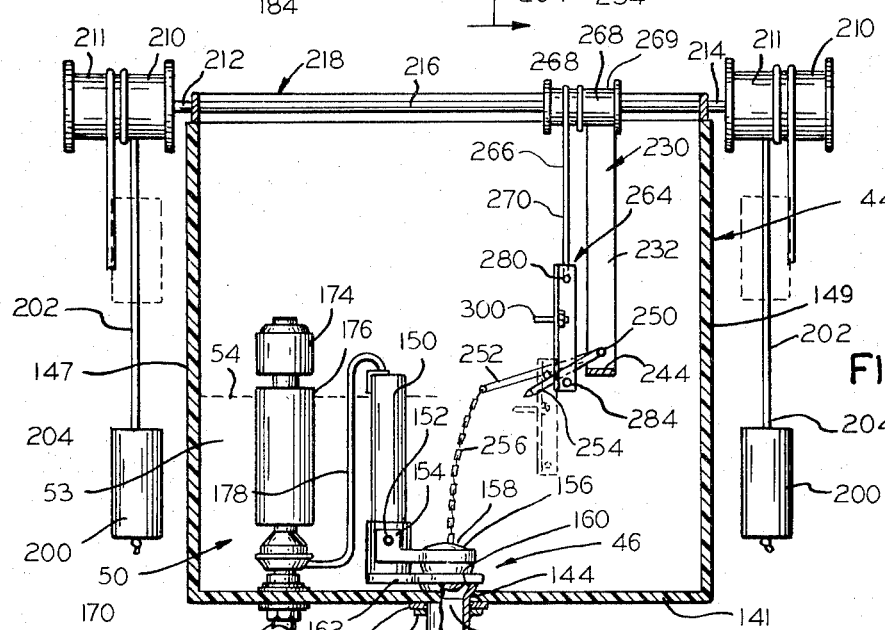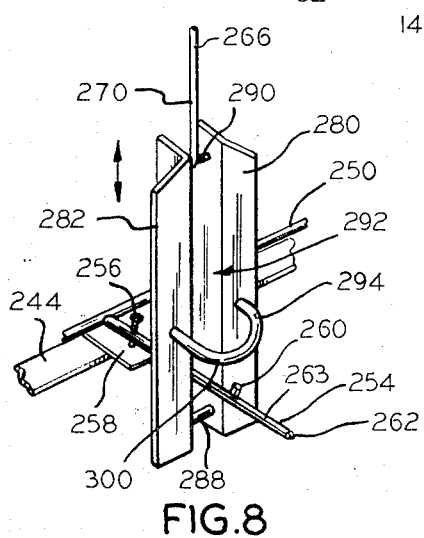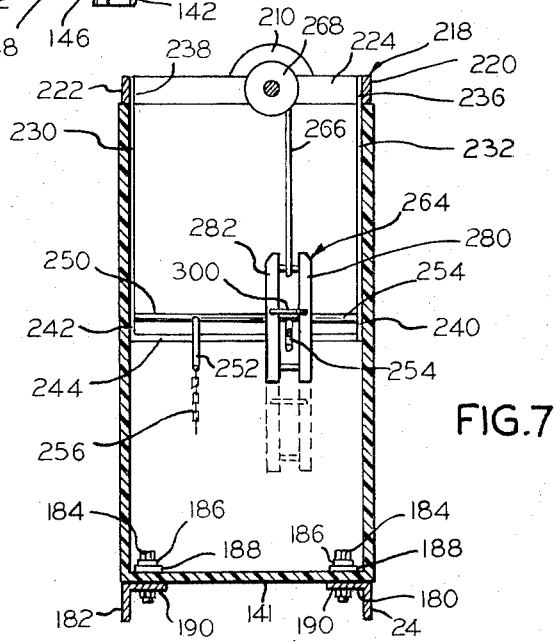

ANIMAL OPERATED TOILET

This invention relates to an animal operated toilet, and more particularly, to a flush type toilet especially suited for use by dogs that is arranged to activate itself for flushing after use by the actions of the dog entering and leaving the toilet.

A number of animal toilets or commodes arranged for use and operation by dogs have been proposed, but those that have come to the applicant's attention have numerous defects that make them impractical to commercialize. It has been found that to be practical, toilets of this type not only should be reliably animal operated, but also must provide a copious water flow type flushing action to carry out both defecation and urine in a manner comparable to human flush toilets. Furthermore, it is an essential that the arrangement of the toilet be sufficiently compatible that the animal's particular defecation habits that the animal will learn to use it with confidence. These features are lacking in prior art devices that the applicant is aware of.

A principal object of this invention is to provide an animal operated toilet that is fully animal controlled and that is arranged so that consistently reliable operation can be expected with a minimum of training.

Another principal object of the invention is to provide an animal operated toilet in which the flushing action is fully animal actuated and yet the toilet provides an environment for defecation that is reasonably compatible with the animal's natural habits.

Another important object of the invention is to provide a novel treadle arrangement especially suited to receive animal defecation and be thoroughly flushed clean after each use of the toilet by the animal.

Still other objects of the invention are to provide a flush control arrangement for animal operated toilets that insures fully automatic operation and adaptability to installation in housing intended primarily for human occupation, to provide an animal operated toilet flush tank arrangement in which standard water level supply and control valves may be employed, and to provide an animal operated toilet that is economical of manufacture, convenient to install, and long lived and reliable in operation.

In accordance with this invention, there is provided an animal operated toilet arrangement that is especially suited for dogs in the form of an open top frame structure defining a drain floor formed with a drain outlet opening adapted to be connected to a conveniently available floor drain or the like. The drain floor is shaped to direct flushing water to the drain opening, and the frame structure is shaped to define an entrance through which the dog moves onto a floating treadle applied over the drain floor that is hinged at one end of same adjacent to but spaced inwardly of the entrance to swing between a level horizontal position and an upwardly inclined position in which the other or inner end of the treadle projects upwardly. A flush tank is mounted over the inner end of the treadle that includes a ball type control valve, and a flush valve actuation arrangement is interconnected between the treadle and control valve to effect opening of the control valve when the dog has left the treadle. The treadle is biased to an upwardly inclined position, and on entry of the animal to defecate, the animal enters on the treadle and his weight presses the treadle to its level position, which conditions the valve actuation arrangement to open the control valve after the animal leaves the treadle, and under the biasing action acting on the treadle to move it to its upwardly inclined position. The result is that the water discharge from the tank is applied in a large volume flush down type flow that washes down the treadle when the treadle is in its upwardly inclined position to wash away the urine and the feces that may be on the treadle.

Still other objects, uses and advantages will be obvious or become apparent from a consideration of the following detailed description and the application drawings.

In the drawings:

FIG. 5 is a plan view of the flush tank and associated structure with the top of the tank removed;

FIG. 6 is a diagrammatic cross-sectional view of the tank substantially along line 6—6 of FIG. 5;

FIG. 7 is a diagrammatic cross-sectional view of the tank taken substantially along line 7—7 of FIG. 5;

FIG. 8 is a diagrammatic perspective view illustrating the pendant actuator of the flush valve control arrangement and associated structure; and FIG. 9 is a fragmental view taken substantially along line 9—9 of FIG. 5.

However, it is to be understood that the specific drawing illustrations provided are supplied primarily to complY With the requirements of the Patent Laws and the invention is susceptible of other embodiments that will be obvious to those skilled in the art, and which are intended to be covered by the appended claims.

GENERAL DESCRIPTION

Figure 1:
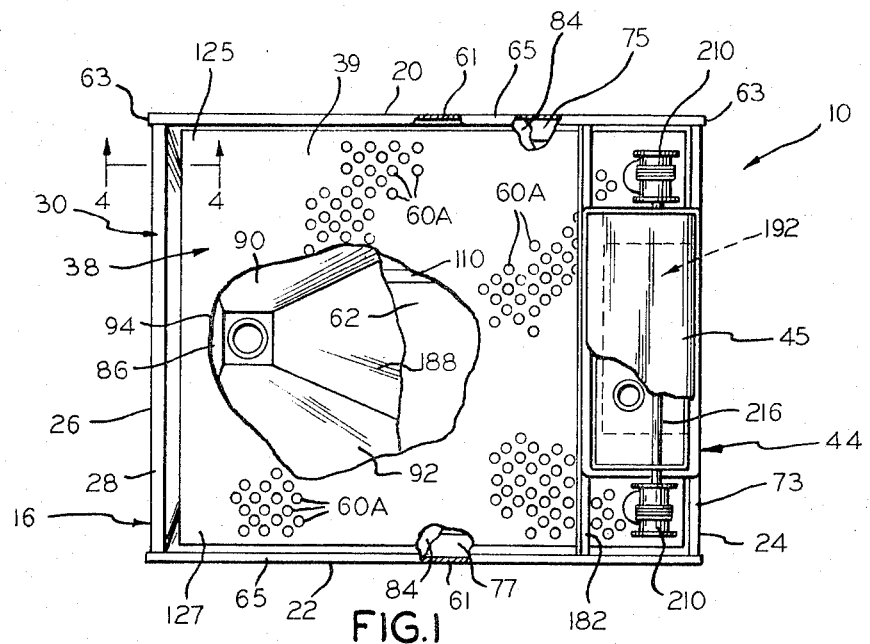
FIG. 1 is a plan view of one form of animal operated toilet arranged in accordance with this invention as especially suited for use by dogs, with parts being broken away to expose other parts.
Figure 3:
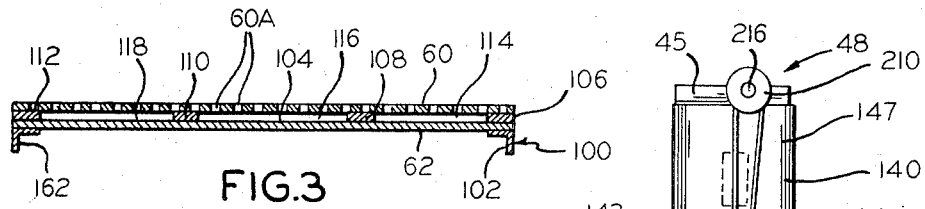
FIG. 3 is a diagrammatic cross-sectional view transversely of the treadle, taken substantially along line 3—3 of FIG. 2.

Reference numeral 10 of FIG. 1 generally indicates one embodiment of my invention that is especially arranged for application to the floor 12 of a residential basement or the like in a position convenient for association with the basement floor drain 14.

The device 10 generally comprises a frame structure 16 defining an enclosing frame 18 having side walls 20 and 22, rear wall 24, and a short front wall 26 terminating in a threshold 28. The side walls 20 and 22 and threshold 28 define an entrance 30 for the device 10.

Mounted within the frame 18 is a pan structure 32 forming a drain floor 34 for the device which is shaped to direct flushing water entering same into a tubular fitting 36 carried by the pan 32 that is disposed within the floor drain opening 14.

Figure 2:
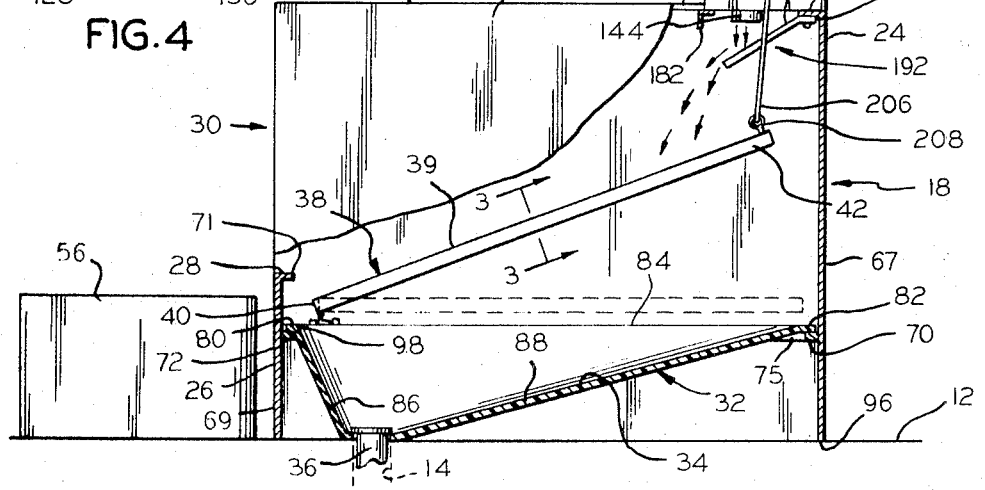
FIG. 2 is a side elevational view of the toilet arrangement of FIG. 1, with parts being broken away to expose other parts and with the full line position of the treadle being the flush down position thereof, and showing the manner in which the flush down is applied to same from the flush tank.

Mounted within the frame 18 and above floor 34 is a treadle 38 of special arrangement which has its forward end 40 positioned adjacent to but spaced from the forward wall 26 of the frame 18 and hinged for movement of the treadle between the dashed and full line positions of FIG. 2. The other end 42 of the treadle 38 is proportioned to extend substantially to the rear wall 24 of the frame in the level position of the treadle.

Mounted on the frame 18 is a flush tank 44 including a flush valve device 46 that is operated, in accordance with this invention, by a flush valve control mechanism 48 that interconnects the inner end of the treadle 42 and the flush valve 46. Tank 44 is provided with a suitable cover 45.

The arrangement is such that the treadle 38 is in its upwardly inclined full line position of FIG. 2 when the device 10 awaits use, and flush valve device 46 is closed to preclude water flow therethrough. Tank 44 is equipped with a suitable tank fill valve device 50 which is connected to a suitable water supply line 52 for supplying water to the tank 44 up to the level dictated by the desired setting of fill valve device 50, such as the level indicated by reference numeral 54 (see FIG. 6).

The device 10 is proportioned in terms of size to provide enough room for the dog that is to use the device to turn around freely and rapidly as desired, and it must have adequate stability to give the dog confidence. Sides, such as those provided by side walls 20, 22 and 24, are necessary for male dogs which by natural habit raise a rear leg to urinate. It is also convenient for smaller dogs to provide a suitable mounting platform 56, such as a wood box in upside down position, or the like. Water conduit 52 is connected to the water supply lines of the residence and tank fill valve 50 operated in a conventional manner to permit filling of the tank 44 to the desired level, in a manner similar to that found in water closets for human toilets.

In use, the dog will enter the device 10 through entrance 30 and move onto treadle 38, which forms the defecation platform of the device. The dog's weight on the treadle moves the treadle from its full line position to the dashed line position of FIG. 2, which at the same time operates the flush valve control mechanism 48 in a manner that conditions it to open the flush valve 46 when the dog leaves the device 10. The dog may defecate on the treadle 38 and/or urinate there, if the dog is a female; a male dog will raise his leg for urination against one of the walls 22 or 24.

As the dog leaves the device 10, treadle 38 returns to its upwardly inclined full line position of FIG. 2, which effects opening of ball valve 46 for a large volume of flush down water flow from tank 44 that flushes down the then inclined treadle to wash urine and any feces that may be on the treadle into pan 32 and thence through conduit fitting 36 into drain opening 14. After flush down, tank 44 automatically refills under the control of tank fill valve device 50 to ready the device 10 for the next use by the dog.

The treadle 38, in accordance with this invention, is of special significance in defining an upper perforated or foraminous plate 60 in closely spaced relation to a lower imperforate plate 62. The arrangement is such that the flushing water flows down in quantities along both the plates 60 and 62, removing any feces and urine on plate 60 and any urine that passes through plate 60 onto plate 62 for liquid conveyance into pan 32 and thence drain opening 14.

SPECIFIC DESCRIPTION

The frame 18 may be made of any suitable metallic or plastic material shaped and proportioned to provide enough room for the dog to turn around freely and rapidly. The various parts of same should be securely fixed together to provide the stability that will give the dog confidence in the device. Corners and edges of the device should be suitably caulked so that all water discharge from tank 44 will pass into pan 32.

In the form shown, side walls 20 and 22 are metal sheets 61 having side edges 63 angled over for securement to the front and back walls by suitable screws (not shown); sheets 61 have their upper edges 65 angled over for reinforcing purposes. The rear and front walls 24 and 26 are formed by suitable sheets 67 and 69, with front wall 24 having angled over upper edge 71 to form threshold 28, and rear wall 26 being angled over to form flange 73.

As indicated in FIG. 2, frame 18 is provided with ledges 70 and 72 along its front and rear walls, and similar ledges 75 and 77 along its side walls, on which rests the pan 32.

Pan 32 in the form illustrated is formed from fiberglass sheeting, but obviously it may be made from any suitable metallic or non-metallic material. It is shaped to define coplanar front and rear edge portions 80 and 82 and side edge portions 84. These edge portions merge into downwardly inclined and converging walls 86, 88, 90 and 92 that lead to a bottom wall 94 to which tubular fitting 36 is suitable applied. Fitting 36 may be in the form of a standard sink fitting with the strainer removed.

The pan 32 is preferably fixed to ledges 70, 72, 75 and 77 in any suitable manner, as by employing rivets or the like, and the joints between the frame 18 and pan 32 should be fully caulked for waterproofing purposes.

Pan 32 should be made from a material which will insure that the drain floor 34 is smooth for good non-clogging characteristics. Floor bottom wall 94 should be in substantial coplanar relationship with the bottom edge 96 of frame 18.

As already indicated, in accordance with this invention, the treadle 38 is positioned so that its front end 40 is spaced from front wall 26 of frame 18, and this spacing should be adequate to permit free full volume liquid flow from treadle 38 directly into the space 98 that separates the end 40 of the treadle from the pan 32 along front wall 26. In addition, wall 86 of the pan 32 should have a steep slope to insure good flush down and elimination of any feces passing onto same from the treadle 38.

As already indicated, the treadle 38 is of special construction. Imperforate plate 62 is reinforced along its undersurface by frame 100 which comprises suitable angle members 102 joined together and to the plate 62 in any convenient manner. Applied across the upper surface 104 of plate 62 are spacer bars 106, 108, 110 and 112 which extend longitudinally of the treadle and thus along the general path of movement that water flow moves down the treadle when discharged on same from tank 44. The perforated plate 60, which is suitably formed with drain openings 60A across its length and width, is applied on top of the spacer bars 106, 108, 110 and 112, these parts all being suitably secured together by screws (not shown) or the like that are flush with the tread surface 39 to avoid injury to the animal using the device 10.

The perforated place 60 of treadle permits urine to drain through same onto imperforate plate 62, which avoids spreading of the urine on the treadle surface 39 by the dog and consequent fouling of the dog's feet. Spacer bars 106, 108, 110 and 112 are of sufficient thickness to separate plates 60 and 62 so as to define relatively flat and planar channels 114, 116 and 118 through which flushing water that has passed through plate 160 may flow to end 40 of the treadle to wash away urine reaching surface 104 of plate 62. In a commercial embodiment of the invention, the spacer bars 106, 108, 110 and 112 are approximately one-eighth inch in thickness or depth, and a depth on this order is preferred in the practice of the invention.

The plates 60 and 62 and the parts associated with same should be made of materials that will be as smooth as possible and corrosion resistant.

Figure 4:
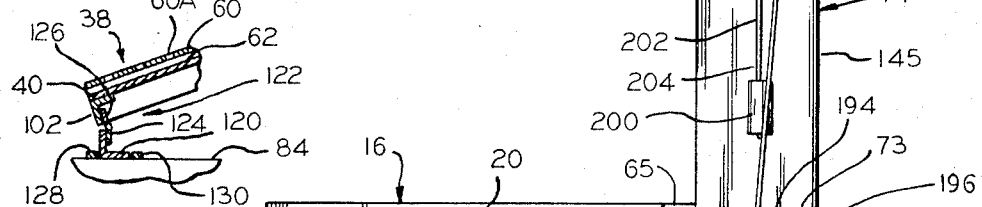
FIG. 4 is a fragmental cross-sectional view through the hinged end of the treadle taken substantiallY alonG line 4—4 of FIG. 1.

As indicated in FIG. 4, at the end 40 of treadle 38 in the form shown an angle member 120 is hinged to the forward angle member 102 of the treadle, by employing a suitable hinge device 122 adjacent each treadle corner 125 and 127 having its leaves 124 and 126 suitably secured to the respective angle members 120 and 102. Angle member 120 is proportioned to extend between side walls 20 and 22 and rest on the side edges 84 of pan 32. The pan side edges 84 are preferably each formed with a pair of projections 128 and 130 that are spaced apart to closely receive the respective ends of angle member 120 for the purposes of seating the treadle in operating position.

Angle member 120 may be suitably affixed to pan 32 if desired, but in the practice of the applicant's invention it has been found that application of the treadle angle member 120 between studs 128 and 130 that are on the side edges 84 of the pan 32 provides an adequate pivotal mounting for the treadle 38. It has also been found that in practice both angle member 120 and hinge 122 may be omitted, the seating, under gravity, of the forward angle member 102 of the treadle 38 between studs 128 and 130 being an adequate pivotal mounting for the treadle. Studs 128 and 130 may be replaced by any suitable type of locating arrangement that holds the treadle end 40 against movement forwardly or rearwardly of entrance 30 in operation.

Tank 44 may be of any suitable type, but preferably has a shape comparable to the water tank of conventional human toilets, and thus defines an upright container structure 140, which in the form shown is formed from a suitable light weight plastic material and has a generally rectangular cross-sectional configuration in hoirzontal section and a generally rectangular cross-sectional configuration in vertical cross-section (see FIGS. 5 and 7) so that the body of water 53 in the tank has considerable head for rapid discharge through discharge opening 142 of the tank.

The discharge opening 142 in the embodiment illustrated is defined by a conventional flush valve device 46 including tubular fitting 144 which defines the actual discharge opening 142 and is secured in place by suitable annular nut 146 applied against sealing disc 148 to clamp the conduit 144 against the bottom wall 141 of the tank.

Device 46 further includes the conventional overflow pipe 150 having pivotally secured thereto, as at 152, a forked frame 154 to which the top 156 of ball valve 158 is secured. Ball valve 158 seats against seat 160 that is defined by frame 162 that is secured to conduit 144 in any suitable conventional manner.

The tank fill valve device 50 comprises a valve structure 170 of a well-known conventional type including a pressure chamber 172 to which water is supplied from conduit 52, and upper and lower cylinders 174 and 176 which may be operated to control the water level 54 within tank 44. This is done by sliding the upper cylinder 174 away from or toward the lower cylinder 176. Conventional refill tube 178 extends from pressure chamber 172 to the top of overflow pipe 150 in a conventional manner for conventional reasons.

The tank 44 defines in addition to bottom wall 141, front side wall 143, rear side wall 145 and end walls 147 and 149. Tank 44 is mounted on frame 18 by being applied to the turned-over top edge 73 of rear wall 18 and angle member 182. Edge 73 is suitably braced by connection to side walls 20 and 22.

As indicated in FIG. 7, tank 44 is secured to edge portion 73 and angle member 182 by employing suitable bolts 184 seated against washers 186 that are in turn seated against sealing discs 188, which bolts extend through suitable openings formed in the tank bottom wall 141 and the members supporting same for application to suitable nuts 190.

As indicated in FIGS. 1 and 2, it is also preferable to apply under discharge conduit 144 a liquid flow spreader 192 in the form of plate 194 having an edge portion 196 suitably affixed to the undersurface of the rear wall turned-over edge 73, and the remainder of same downwardly inclined and extending underneath discharge tube 144, for the purpose of spreading the water flushing discharge over the width of the treadle.

The flush valve actuation device 48 in the form shown is a gravity operated arrangement comprising a pair of weights 200 that are respectively supported by the respective cords 202 having their ends 204 suitably secured to the respective weights and their other ends 206 suitably secured to suitable hook eyes or the like 208 secured to the end 42 of the treadle. The cords 202 are respectively trained over the respective pulleys 210 which are journaled at the ends 212 and 214 of shaft 216 that is itself journaled in a frame 218 suitably applied to the top of tank 44.

Frame 218 comprises side members 220 and 222 suitably joined at their respective ends to end members 224 and 226 and suitably supported on the top of the tank.

Frame 218 includes a pendant frame portion 230 in the form of depending members 232 and 234 suitably secured to the respective frame side members 220 and 222 at their upper ends 236 and 238, respectively, and having their lower ends 240 and 242 respectively secured to a lower frame member 244. Frame 218 and its portion 230 may be formed from suitable lengths of aluminum or the like.

Frame portion 230 journals a rock shaft or rod 250 which includes a first or valve actuating lever 252 and a second or control lever 254. The valve actuating lever 252 is suitably connected to ball valve 158 by chain type connector 256.

The control lever 254 includes an adjustment screw 256 (see FIG. 8) that engages a stop plate 258 suitably fixed to lower frame member 244 of frame portion 230 to position the control lever 254 in a desired position of adjustment. Lever 254 also includes an upwardly extending projection 260 adjacent to but spaced from its outer end 262. End 262 is preferably tapered, as indicated in FIG. 8.

Operably associated with control lever 254 is a pendant actuator member 264 suspended from cord 266 that is secured to pulley 268 which is keyed to shaft 216 for rotation therewith. As indicated in FIGS. 5 and 6, the cord 266 is wound on pulley 268 to give member 264 movement in reverse of the movement given weights 200 on rotation of shaft 216. In other words, when weights 200 are moved upwardly, actuator member 264 moves downwardly, and vice versa. Cord 266 is secured at its end 270 to member 264 and its other end 272 is anchored to pulley 268.

Pendant member 264 comprises a pair of angle elements 280 and 282 joined together by suitable bolts 284 and 286 received through the respective sleeves 288 and 290 which space the angle members 280 and 282 from each other to define a working space 292 therebetween. U-bolt 294 is applied between the two members 280 and 282, and member 264 is suspended and positioned so that control lever 254 extends through working space 292, as indicated in FIG. 8. The end 270 of cord 266 is secured to the upper sleeve 290.

The relationship of parts of the valve control device 48 is such that when treadle 38 is in the full line unusued position of FIG. 4, the actuator member 264 is in the upper inoperative positions of FIGS. 6 and 7. When the dog enters the device 10, and specifically, enters on the surface 39 of treadle 38, the treadle 38 moves under the weight of the dog to the dashed line level position of FIG. 4, which moves the weights 200 to approximately the dashed line position of FIG. 2. In so doing, the actuator member 264 moves to the dashed line positions of FIGS. 6 and 7; in this connection, it is to be noted that the cord 266 depends from the opposite side of pulley 268 with respect to the sides of pulleys 210 that the lengths of cords 202 which support weights 200 depend from. Also, the circumference of working surface 269 of pulley 268, as compared to the working surfaces 211 or pulleys 210, is of reduced dimension, to provide a reduced vertical path of movement of the actuator member 264 within tank 44. In a commercial embodiment of the invention, the circumference of surface 269 is about one-half the circumferences of surfaces 211.

As actuator member 264 moves downwardly, the bite 300 of U-bolt 294 engages end portion 263 of lever 254, and under the action of gravity, the member 264 slides downwardly over the end 262 of the lever 254. In this connection, it is to be noted that the bite 300 extends sufficiently beyond the angle elements 280 and 282 of member 264 so that the bite 300 engages lever end portion 263 between its end 262 and its projection 260.

Downwardly movement of the actuator member 264 continues until its sleeve 290 engages projection 260, which suspends the actuator member 264 from further downward vertical movement, and also completes the setting or positioning of the actuator member for operating rock shaft 250 to unseat ball valve 158 after the dog leaves the treadle 38.

When the dog leaves the treadle 38, weights 200 under the action of gravity return the treadle to the full-line position of FIG. 2. This action, by means of the interconnection of the actuator member 264 to the treadle 38, moves the actuator member 264 upwardly, with the bite 300 of U-bolt 294 engaging under lever 254 to rock lever 254 upwardly, which gives a corresponding rocking motion to valve actuating member which unseats ball valve 158 to start water flow through passage 142. Actuator member 264 continues to move upwardly, permitting the end 262 of lever 254 to swing past the bite of U-bolt 294, whereby rock shaft 250 and its levers return under gravity to the full line position of FIG. 6.

Good results are obtained by arranging control lever 254 to operate approximately between a 30° downward inclination under the action of actuator member 264.

Flush ball valve 158 is of the conventional hollow air filled core type which tends to float in water, thus remains unseated from its seat 160 in the conventional manner until the water in tank 44 has substantially reached the level of seat 160 whereby the weight of ball valve 158 returns it to its seat. In the meantime, upon the opening of the ball valve 158, a large volume water flow in copious proportions gushes through passage 142 onto flow spreader 192 and thence onto platform surface 39 of treadle 38 to wash both the surfaces 39 and 116 of same thoroughly down in the direction of passage 198. However, by the time the flush water starts coursing down treadle 38, it will have returned to the inclined position of FIG. 2.

In this connection, it is pointed out that the applicant has found that the relatively close spacing of surfaces 39 and 116 of the treadle insures that a copious water flow proceeds down both of the surfaces even though the upper treadle plate 60 is perforated with the multitude of perforations or openings 60A. Plate 60 is preferably of the flat plate or sheet type, and while openings 60A may be of any shape, they should be relatively small and closely spaced.

The thorough flush down of both the surfaces 39 and 116 of the treadle washes any feces and urine contained thereon to the front of the device 10 with the resulting water flow coursing through space 98 and into pan 32 and thence to drain passage 14.

The tank fill valve device operates in the conventional manner to return the level of the water to the said level 54, and the device 10 awaits the next use of same by the dog.

Cords 202 are secured to the respective pulleys 210 by clamp devices 213, which, as shown in FIG. 9, each comprise a strip of metal 215 arced as at 217 to receive the cord and secure it against the respective surfaces 211 by suitable screws 219. Clamp devices 213 define the lower movement of the weights 200 and thus the elevated position of the treadle 38. Adjustments in these positions may be made by loosening clamp devices 213 and retightening them when adjustment is completed. A similar clamp device 221 is employed to secure the end 272 of cord 66 to pulley 268, and this facilitates adjustment of the operating position of member 264 relative to rock shaft 250. The angulation of control lever 254 may be adjusted by adjusting screw 256.

The "waiting" position of the treadle (see the full line position of FIG. 2) is preferably at an angle on the order of 30° with respect to the horizontal. However, this may be varied within relatively wide limits, depending on the situation. Initial dog training to use the device may make it desirable to have the treadle "waiting" position at a flatter angle; the steeper angle might be required for clean wash-away of the feces for some dogs where the feces tends to be adherent.

While the illustrated embodiment of the invention employs weights 200 to bias treadle 30 in its full line position of FIG. 2, it is obvious that suitable tension or compression spring arrangements may be employed for this purpose.

As indicated, substantially all of the water coursing down treadle 38 during flushing moves along the treadle. I have found that wash down of walls 20, 22 and 24, even where male dogs use device 10, is not necessary, and in practice, for training purposes, it is advisable that such urine or remains on them be relied on to satisfy the dog that the device 10 is a dog's toilet.

The device 10 may be conveniently mounted in the home owner's basement over a convenient drain opening 14, and water supply conduit 52 suitably connected to a convenient source of water. Experience has shown that dogs readily learn to use the device 10 without undue training problems, thereby eliminating the "dog walking" problem.

It is contemplated that the device 10 may be mounted so that drain fitting 36 could be connected to, instead of a drain opening 14, a pump type discharge arrangement for conveying the materials discharged from device 10 to the bowl of a conventional human water closet. This type of arrangement is especially desirable for use in apartment buildings and the like where access to basement drain openings is very restricted.

The foregoing description and the drawings are given merely to explain and illustrate the invention and the invention is not to be limited thereto, except insofar as the appended claims are so limited, since those skilled in the art who have the disclosure before them will be able to make modifications and variations therein without departing from the scope of the invention.

I claim:

1. A flush toilet arranged for and operated by an animal comprising:
   a frame structure defining:
   a drain floor and drain opening with said floor sloping toward said opening, and
   an entrance to said frame structure,
   a treadle positioned across said floor and within said frame structure,
   said treadle projecting inwardly of said entrance and being applied to said frame structure for swinging movement between a substantially level position and an upwardly inclined position about an axis adjacent to but spaced from said entrance and adjacent the level of said level position thereof,
   a flush tank mounted on said frame structure above said treadle,
   means for biasing said treadle to its upwardly inclined position,
   said flush tank defining a discharge opening proportioned to pass a copious liquid flushing flow therethrough,
   flush valve means for closing said tank opening,
   and means for opening said flush valve means to flush down said treadle,
   said opening means comprising:
   a flushing mechanism operatively connected to said flush valve means,
   and actuation means operatively interconnecting said flushing mechanism and said treadle and including means for prepositioning said flushing mechanism for flushing operation when an animal mounts said treadle to move same to its level position, and means for actuating said flushing mechanism to open said flush valve means in response to said treadle returning to its upwardly inclined position on the animal leaving said toilet,
   said treadle comprising:
   a substantially planar plate structure including a lower imperforate plate and an upper foraminous plate in closely spaced relation to said lower plate.

2. A flush toilet arranged for and operated by an animal comprising:
   a frame structure defining:
   a drain floor and drain opening with said floor sloping toward said opening, and
   an entrance to said frame structure at the front side of same,
   a treadle positioned across said floor and within said frame structure and having one end of same disposed adjacent said entrance and the other end of same extending inwardly of said frame structure,
   said treadle being applied to said frame structure for swinging movement between a substantially level position and an upwardly inclined position about an axis adjacent to but spaced from said entrance and adjacent the level of said level position thereof,
   said axis being adjacent said one end of said treadle,
   a flush tank mounted on said frame structure above said treadle,
   means for biasing said treadle to its upwardly inclined position wherein said other end thereof projects upwardly,
   said flush tank defining a discharge opening proportioned to pass a copious liquid flushing flow therethrough and directed against said treadle adjacent said other end thereof,
   flush valve means for closing said tank opening,
   means for connecting a source of liquid to said tank including means for maintaining the liquid in said tank at a predetermined level for flush flow purposes through said tank opening,
   and means for opening said flush valve means to flush down said treadle with liquid contained in the tank,
   said opening means comprising:
   a flushing mechanism operatively connected to said flush valve means,
   and actuation means operatively interconnecting said flushing mechanism and said treadle and including means for prepositioning said flushing mechanism for flushing operation when an animal mounts said treadle to move same to its level position, and means for actuating said flushing mechanism to open said flush valve means in response to said treadle returning to its upwardly inclined position on the animal leaving said toilet, whereby the head of liquid in said tank forces a large volume liquid flow through said tank discharge opening to flush down said treadle,
   said treadle comprising:
   a substantially planar plate structure including a lower imperforate plate and an upper foraminous plate in closely spaced relation to said lower plate, whereby on flushing of said treadle there is a substantial liquid flow down both said plates.

3. The toilet set forth in claim 2 wherein:
   said flushing mechanism comprises:
   a rock shaft including first and second levers projecting from the same side of said rock shaft and moving between first and second positions of elevation on rocking of said rock shaft, said first lever being operatively connected to said flush valve means for opening same on movement of said shaft in one direction to move said first lever to the upper of said positions, said actuating means comprising:

a pendant member received over said second lever, said pendant member including a camming surface and a stop component, said second lever including a cathc seat positioned to catch said pendant member stop component when said pendant member is lowered to a predetermined elevation, said pendant member camming surface being positioned to upwardly cam said second lever to its upper position on upward movement of said pendant member to a second predetermined elevation, said pendant member being formed to pass said second lever by said camming surface on movement of said pendant member to its said second elevation, whereby said rock shaft rocks under action of gravity to return said second lever to its lower position, and means for moving said pendant member in timed relation to movements of said treadle between its said positions.

4. The toilet set forth in claim 2 including:

liquid flow spreader means under said tank opening for spreading said liquid flow, on opening of said flush valve means across said treadle.

5. The toilet set forth in claim 2 wherein:

said drain opening is adjacent but vertically below said entrance, said drain floor including a downwardly sloping Wall running along but spaced intermediate said treadle one end and said entrace for passing liquid flow from said treadle to said drain opening.

6. The toilet set forth in claim 3 wherein said means for moving said pendant comprises:

cord and pulley means interconnecting said treadle other end and said pendant member, and wherein said biasing means is of the gravity actuated type.

7. A flush toilet arranged for and operated by an animal comprising:

a frame structure defining:

a drain floor and drain opening with said floor sloping toward said opening, and a vertical wall structure upstanding from said drain foor about the margin of the latter and defining an entrance to said frame structure at the front side of said frame structure, said drain floor being in leakage free relation with said wall structure about said margin thereof, a substantially planar treadle positioned across said floor and within said frame structure and having one end of same disposed adjacent to but spaced inwardly said wall structure at said entrance and the other end of same extending inwardly of said frame structure, said treadle being substantially coextensive with said drain floor and defining with said wall structure at said entrance a flush discharge opening to said drain floor that is substantially coextensive with the width of said treadle, said treadle being applied to said frame structure for swinging movement between a substantially level animal use position and an upwardly inclined flushing position about an axis adjacent to but spaced from said entrance inwardly of said frame structure and adjacent the level of said level position thereof, said axis being adjacent said one end of said treadle, means for biasing said treadle to its upwardly inclined position wherein said other end thereof projects upwardly inwardly of said frame structure, a flush tank mounted on said frame structure above said treadle, said flush tank defining a discharge opening above said other end of said treadle and proportioned to pass a copious liquid-flushing flow therethrough, flush valve means for closing said tank opening, and means for opening said flush valve means to flush down said treadle, said opening means comprising:

a flushing mechanism operatively connected to said flush valve means, and actuating means operatively interconnecting said flushing mechanism and said treadle and including means for prepositioning said flushing mechanism for flushing operation when an animal mounts said treadle to move same against the action of said biasing means to its said level position, and means for actuating said flushing mechanism to open said flush valve means in response to said treadle returning to its said upwardly inclined position under the action of said biasing means on the animal leaving said toilet, and liquid flow spreader means under said tank opening and above said treadle other end for spreading said liquid flow on opening of said flush valve means, across the width of said treadle, 4 whereby on actuation of said flushing mechanism when said treadle returns to its said flushing position after animal use, said copious liquid flushing flow courses down across the width of said treadle and through said discharge opening to said drain floor to fully flush down said treadle.

8. The toilet set forth in claim 7 wherein said treadle comprises:

a plate structure including a lower imperforate plate and an upper foramious plate in closely spaced relation to said lower plate.

* * * * *